(12) United States Patent
Kitada et al.

(10) Patent No.: US 6,817,432 B2
(45) Date of Patent: Nov. 16, 2004

(54) HYBRID VEHICLE

(75) Inventors: Shinichiro Kitada, Tokyo (JP); Masaaki Uchida, Yokosuka (JP); Noboru Hattori, Yokosuka (JP); Toshio Kikuchi, Yokosuka (JP); Yutaro Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/132,186

(22) Filed: Apr. 26, 2002

(65) Prior Publication Data

US 2002/0170757 A1 Nov. 21, 2002

(30) Foreign Application Priority Data

May 16, 2001 (JP) ........................................ 2001-145719

(51) Int. Cl.[7] ................................................ B60K 1/00
(52) U.S. Cl. ........................ 180/65.3; 180/65.4; 60/698
(58) Field of Search .............................. 180/65.1, 65.2, 180/65.3, 65.4; 477/3, 27; 60/698, 719; 290/47, 48

(56) References Cited

U.S. PATENT DOCUMENTS 5,757,151 A * 5/1998 Donegan et al. ............ 318/150
5,945,808 A * 8/1999 Kikuchi et al. ............. 320/132
6,059,058 A * 5/2000 Dower ....................... 180/65.3
6,215,198 B1 * 4/2001 Inada et al. ................ 290/40 C
6,278,915 B1 * 8/2001 Deguchi et al. .............. 701/22
6,484,830 B1 * 11/2002 Gruenwald et al. ........ 180/65.2
6,570,265 B1 * 5/2003 Shiraishi et al. .......... 290/40 C

FOREIGN PATENT DOCUMENTS

JP      2000-209706 A      7/2000

* cited by examiner

*Primary Examiner*—Christopher P. Ellis
*Assistant Examiner*—Brian Swenson
(74) *Attorney, Agent, or Firm*—Shinjyu Global IP; Counselors, LLP.

(57) ABSTRACT

A hybrid vehicle is provided that lowers the cost of series hybrid vehicles in order to make it easier for series hybrid vehicles to gain popularity. A hybrid vehicle equipped with an engine, a first rotary electric machine and a second rotary electric machine. The first rotary electric machine is coupled to the output shaft of the engine, while the second rotary electric machine is electrically coupled to the first rotary electric machine and coupled to the drive wheels of the vehicle. The maximum generated electric power of the first rotary electric machine is substantially equal to the maximum output power of the second rotary electric machine.

3 Claims, 2 Drawing Sheets

HYBRID VEHICLE

BACKGROUND OF THE INVENTION

1. Field of the Invention

The present invention relates to a hybrid vehicle having a plurality of power sources. More specifically, the present invention relates to a series hybrid vehicle equipped with an engine, a first rotary electric machine and a second rotary electric machine.

2. Background Information

A series hybrid vehicle is a useful method of extending the cruising distance of an electric automobile driven by an electric motor. The typical series hybrid vehicle has an electric motor that is operated in series with an engine that has a generator for charging an onboard battery while the vehicle is traveling. In such series hybrid vehicles, it is typical for the engine to be stopped when the battery is sufficiently charged and for the engine to be operated to drive the generator when the charged condition of the battery starts to become insufficient. In such a case, the engine is basically operated at its rated capacity, and thus, an engine having a relatively small output can be used. At the same time, the generator has a relatively small generating capacity in keeping with the output of the engine. In short, the cost of conventional series hybrid vehicles is held in check by reducing the size of the engine and generator.

In view of the above, there exists a continuing need for an improved hybrid vehicle. This invention addresses this need in the art as well as other needs, which will become apparent to those skilled in the art from this disclosure.

SUMMARY OF THE INVENTION

It has been discovered that in conventional series hybrid vehicles, as mentioned above, the engines have completely different specifications from those used in other common vehicles, i.e., vehicles installed with mechanical transmissions. It is a major disadvantage to have to produce small quantities of engines having special specifications. Furthermore, in order to provide a plurality of series hybrid vehicle models having different characteristics, it is necessary to prepare engines and generators matched to each set of characteristics. Thus, hybrid vehicle models having different characteristics make it even more difficult to lower the cost of the series hybrid vehicle.

In view of the problems associated with the prior art, one object of the present invention is to employ mass production to reduce the cost of series hybrid vehicles and make it easier for series hybrid vehicles to become popular.

With this arrangement, the maximum output of the second rotary electric machine (which mainly generates the vehicle driving power) and the maximum generated electric power of the first rotary electric machine (which mainly generates electricity) are substantially equal. Consequently, it is possible to drive the vehicle at maximum output (i.e., run the second rotary electric machine at maximum output) at all times regardless of the storage status of the electric storage device installed between the two rotary electric machines. Also, the capacity and maximum output of the electric storage device can be set freely. For example, installation of the electric storage device can be eliminated or an electric storage device having a very small capacity and maximum output can be installed. In such a case, the first rotary electric machine and second rotary electric machine are used together simply as a transmission; this kind of series hybrid vehicle can be substituted for vehicles that use mechanical transmissions.

Meanwhile, if an electric storage device having a relatively large capacity and maximum output is installed in the vehicle, a similar fuel efficiency improvement effect to that of conventional series hybrid vehicles can be obtained. Furthermore, the characteristics of the series hybrid vehicle can be changed easily by changing the capacity and maximum output of the electric storage device installed. In short, the present invention makes it possible to use engines and electric rotating devices having the same specifications to manufacture vehicles that are equivalent to vehicles installed with conventional mechanical transmissions as well as series hybrid vehicles that are intended to improve fuel efficiency. The cost increase required for improving the fuel efficiency can be limited to the cost increase associated with the electric storage device.

With this arrangement, a single casing housing both the first and second rotary electric machines can be handled in the same manner as a conventional mechanical transmission, making it possible to avoid extensive modification of the manufacturing process. Also, since it is not necessary to change the shape of the casing in response to the existence or capacity of the electric storage device, a single common casing and a common vehicle-side structure for mounting the casing can be used for all vehicle models. Thus, the present invention enables further cost reductions.

The foregoing can basically be attained by a hybrid vehicle comprising an engine, a first rotary electric machine and a second rotary electric machine. The engine has an output shaft. The first rotary electric machine has a maximum generated electric power and is operatively coupled to the output shaft of the engine. The second rotary electric machine has a maximum output power and is electrically coupled to the first rotary electric machine and operatively coupled to a drive wheel of the hybrid vehicle, The maximum generated electric power of the first rotary electric machine is substantially equal to the maximum output power of the second rotary electric machine.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
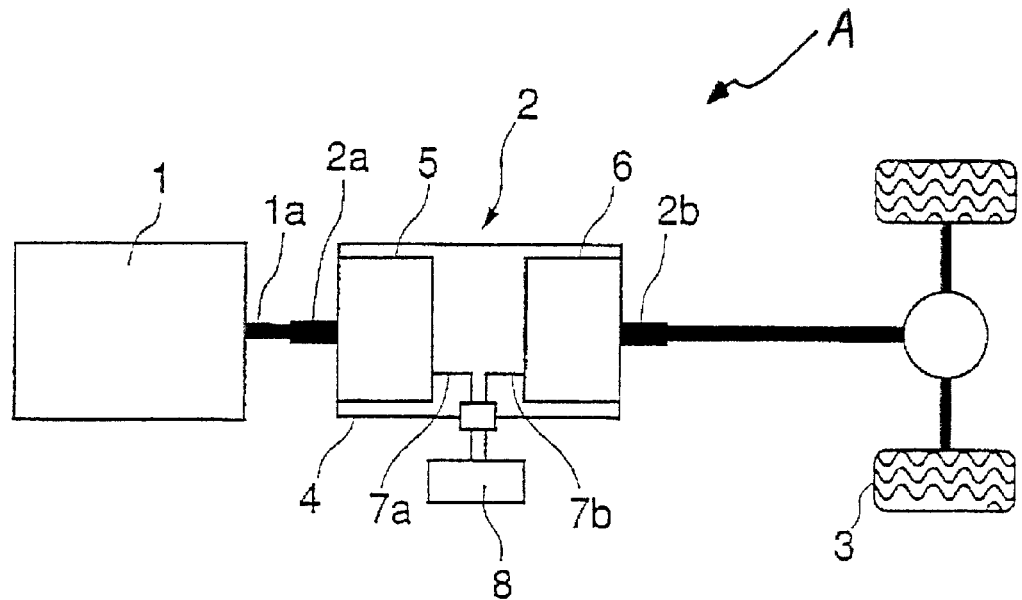
FIG. 1 is a schematic view of a drive train of a hybrid vehicle (Model A) in accordance with a first embodiment of the present invention.

Referring initially to FIG. 1, a drive train of a hybrid vehicle (Model A) is illustrated in accordance with a first embodiment of the present invention. The drive train of the hybrid vehicle (Model A) has characteristics equivalent to those of a vehicle installed with a conventional mechanical transmission. The drive train of the hybrid vehicle A basically includes an engine 1 operatively coupled to an electric transmission 2, which in turn is operatively coupled to the drive wheels 3 of the vehicle A via a final gearing arrangement.

The engine 1 is a conventional component such as a conventional internal combustion engine that is well known in the art. Since engines are well known in the art, the engine 1 will not be discussed or illustrated in detail herein. Specifically, an output shaft 1a of the engine 1 is mechanically coupled to an input shaft 2a of the electric transmission 2 to transfer power from the engine 1 to the electric transmission 2. An output shaft 2b of the electric transmission 2 is mechanically coupled to the drive wheels 3 of the vehicle via final gears in a conventional manner.

The electric transmission 2 basically includes a casing 4, a first rotary electric machine 5 and a second rotary electric machine 6. The first and second rotary electric machines 5 and 6 are housed inside the casing 4. The input shaft 2a of the electric transmission 2 serves as a rotor input shaft of the first rotary electric machine 5. The output shaft 2b of the electric transmission 2 serves as the rotor output shaft of the second rotary electric machine 6. The rotary electric machines 5 and 6 mentioned here are preferably synchronous electric motors that generate electricity and running power by using three-phase alternating current matched to the rotational phases of the rotor shaft flow through a stator coil. The rotary electric machines or motors 5 and 6 are designed such that the maximum generated electric output power of the first rotary electric machine 5 is substantially equal to the maximum generated electric output power of the second rotary electric machine 6.

The first rotary electric machine 5 is electrically coupled to an inverter 8 by electrical wiring 7a. The second rotary electric machine 6 is electrically coupled to the inverter 8 by electrical wiring 7b. Thus, the first and second rotary electric machines 5 and 6 are electrically coupled together through the inverter 8. As seen in FIG. 1, the inverter 8 is located outside of the casing 4. The inverter 8 controls the current of the first and second rotary electric machines 5 and 6. In other words, the first rotary electric machine 5 and the second rotary electric machine 6 are connected together electrically via the inverter 8.

With the electric transmission 2 of the present invention, the output power Pe of the engine 1 (i.e., Pe=rotational engine speed Ne×torque Te) is converted to electric power Pg by the first rotary electric machine 5. This generated electric power Pg is delivered as is to the second rotary electric machine 6, and then converted to the output power Pm of the second rotary electric machine 6 (i.e., Pm=rotational motor speed Nm×torque Tm). Here, the output power Pe of the engine 1 is equal to the output power Pm of the second rotary electric machine 6 and the following relationship is established between the torque Te of the engine 1 and the torque Tm of the second rotary electric machine.

$$Tm=(Ne/Nm)\times Te$$

In short, the electric transmission 2 has the same function as a conventional mechanical transmission. The torque Tm is smaller than the torque Te by the amount of the loss that occurs during energy conversion because the energy conversion efficiency of the first rotary electric machine 5 and the second rotary electric machine 6 is not 100%. Of course, this kind of power transmission loss also occurs when a mechanical transmission is used (e.g., frictional losses between gear teeth and other losses).

The control of such a vehicle can be accomplished, for example, as follows. First, a target output of the second rotary electric machine 6 is determined based on the vehicle speed and the amount by which the driver is depressing the accelerator. A target generated electric power of the first rotary electric machine 5 is determined based on the aforementioned target output and a target output of the engine 1 is determined based on the target generated electric power of the first rotary electric machine 5. The intake air and fuel injection amounts of the engine 1 are controlled based on the target engine output. By setting the maximum generated electric power of the first rotary electric machine 5 and the maximum output power of the second rotary electric machine 6 to be substantially equal, the first rotary electric machine 5 can always generate electric power that is matched to the target output power of the second rotary electric machine 6. Also, since the output of the engine 1 is controlled in response to the vehicle speed and the amount by which the driver is depressing the accelerator, the driver will not be subjected to the feeling that he or she is driving a special type of vehicle.

In order to execute the control described here, it is necessary for the intake air amount of the engine 1 to be arbitrarily adjustable, and thus, it is imperative that the engine 1 be equipped with an electronically controlled throttle. Meanwhile, it is acceptable for the accelerator pedal to be mechanically linked to the throttle of the engine 1. In such a case, the generated electric power of the first rotary electric machine 5 and the output power of the second rotary electric machine 6 are controlled in accordance with the actual output power of the engine 1.

Second Embodiment

Figure 2:
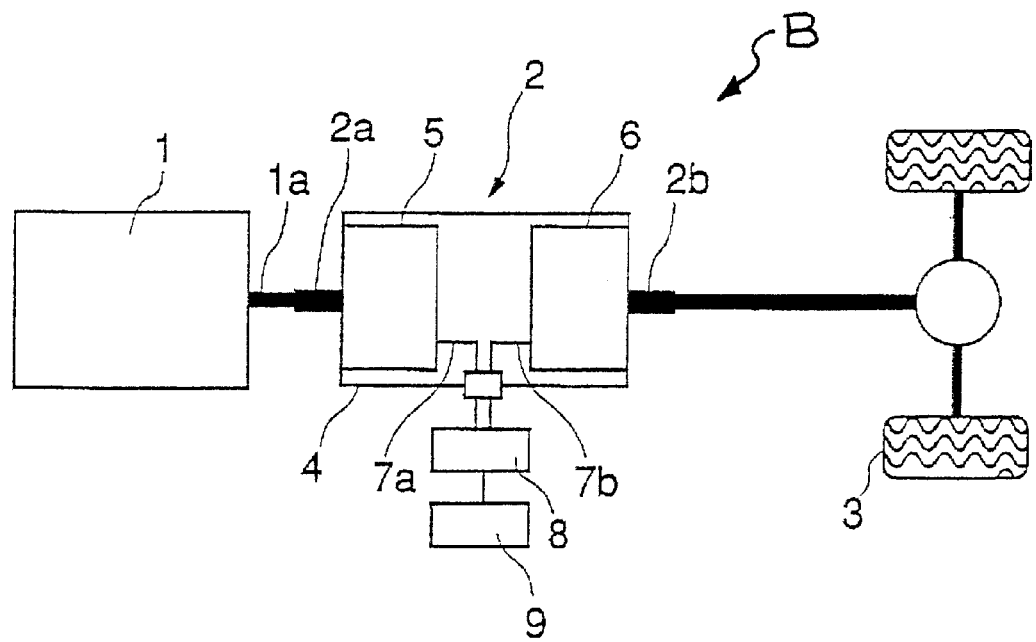
FIG. 2 is a schematic view of a drive train of a hybrid vehicle (Model B) in accordance with a second embodiment of the present invention.

Referring now to FIG. 2, a drive train of a hybrid vehicle (Model B) is illustrated in accordance with a second embodiment. The drive train of the hybrid vehicle B has characteristics lying in-between those of a vehicle installed with a conventional mechanical transmission and those of a series hybrid vehicle intended to improve fuel efficiency. The drive train of the hybrid vehicle B will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The hybrid vehicle B of the second embodiment shown in FIG. 2 differs from hybrid vehicle A only in that a battery or electric storage device 9 of relatively small capacity and maximum output is connected to the inverter 8. Otherwise, the hybrid vehicle B of the second embodiment is identical to the hybrid vehicle A of the first embodiment. This hybrid vehicle B of the second embodiment is controlled basically in the same manner as the hybrid vehicle A of the first embodiment as discussed above. In the hybrid vehicle B, there is almost no transfer of electric power to and from the battery 9.

The second rotary electric machine 6 generates electric power when the vehicle is braked and this electric power can be used to recharge the battery 9. The amount of electric power regenerated during braking cannot be set to a very large value because the capacity of the battery 9 is small, but the fuel efficiency can be improved somewhat by utilizing the regenerated electric power effectively. For example, since the thermal efficiency of a typical engine declines when the load is low, the fuel efficiency can feasibly be improved to some degree, even if the capacity of the battery 9 is small, by stopping the engine 1 and driving the vehicle with the electric power from the battery 9 only when the vehicle B is being driven at low speeds and the required driving force is small. When the vehicle speed exceeds a prescribed speed, the engine 1 can be started easily by running the first rotary electric machine 5.

When this type of operation is attempted in a vehicle installed with a mechanical transmission, a special small-output rotary electric machine must be developed and a structure must be devised to connect the rotary electric machine to an appropriate position of the vehicle drive train. In some cases, a special transmission casing must also be developed. Conversely, the hybrid vehicle B of the second embodiment can be manufactured by merely adding the battery 9 with a small electric capacity to the hybrid vehicle A of the first embodiment. Thus, thus, the new development and capital investment needed to prepare the hybrid vehicle B of the second embodiment in addition to the hybrid vehicle A of the first embodiment can be held to a minimum.

Third Embodiment

Figure 3:
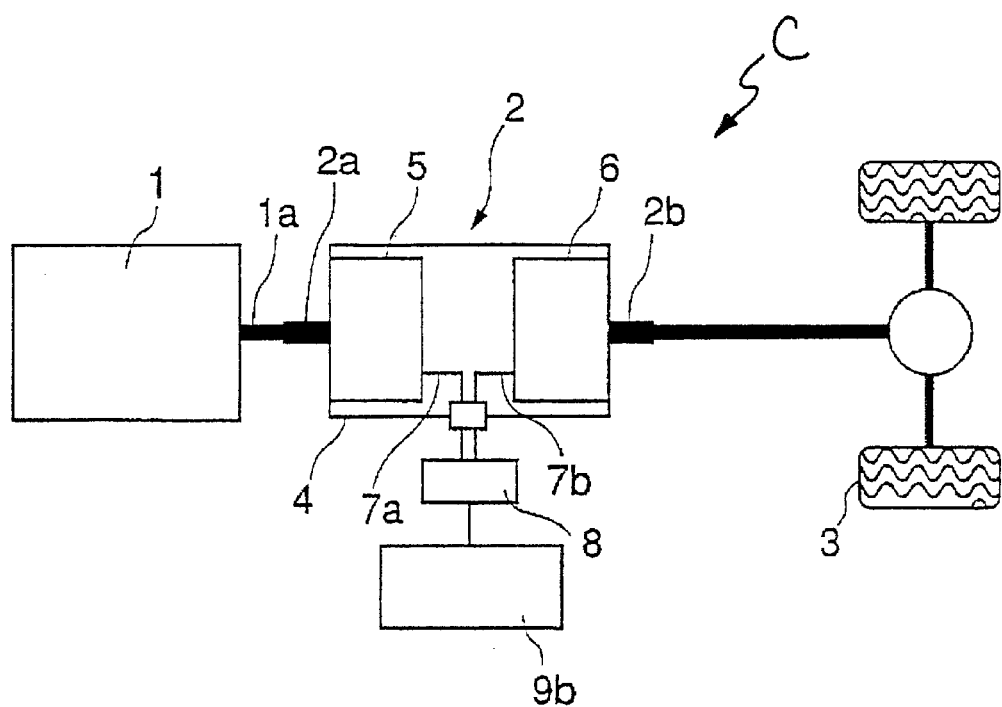
FIG. 3 is a schematic view of a drive train of a hybrid vehicle (Model C) in accordance with a third embodiment of the present invention.

Referring now to FIG. 3, a drive train of a hybrid vehicle (Model C) is illustrated in accordance with a third embodiment. The drive train of the hybrid vehicle C has characteristics intended to improve the fuel efficiency. The drive train of the hybrid vehicle C will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The hybrid vehicle C of the third embodiment shown in FIG. 3 differs from hybrid vehicle A only in that a battery or electric storage device 9b of relatively large capacity and maximum output is connected to the inverter 8. Otherwise, the hybrid vehicle C of the third embodiment is identical to the hybrid vehicle A of the first embodiment. This hybrid vehicle C of the third embodiment is controlled basically in the same manner as the hybrid vehicle A of the first embodiment as discussed above.

Control of this hybrid vehicle C is the same as for a normal series hybrid vehicle.

For example, ample electric power is generated by regeneration during braking and used to recharge the battery 9b. Meanwhile, when sufficient electric power is stored in the battery 9b, the engine 1 is stopped and the hybrid vehicle C is driven exclusively with electric power from the battery 9b. When the battery 9b requires charging, the engine 1 is run at operating conditions that are most favorable in terms of thermal efficiency and the first rotary electric machine 5 is made to generate electricity. This kind of operation enables the maximum fuel efficiency improvement effect to be achieved. Furthermore, by switching to the same control method that is used in the hybrid vehicle A of the first embodiment, this hybrid vehicle C can be controlled such that the second rotary electric machine 6 runs at maximum output even when the battery 9b is poorly charged.

In the hybrid vehicle C of the third embodiment as well, the only special component in the drive train is the large electric capacity of the battery 9b. So long as a space for installing the battery 9b is secured, this hybrid vehicle C can use the same vehicle body as the hybrid vehicle A of the first embodiment and the hybrid vehicle B of the second embodiment.

Thus, a group of vehicle models having a variety of characteristics ranging from those of a conventional vehicle installed with a mechanical transmission to those of vehicles for which a great improvement in fuel efficiency can be manufactured, while holding development costs and capital investment to a minimum. In other words, different vehicle, such as vehicles A, B and C, can be manufactured by using a single type of the electric transmission 2 in which the maximum output of the second rotary electric machine 6, which mainly generates vehicle driving power, substantially equals the maximum generated electric power of the first rotary electric machine 5, which mainly generates electricity.

As previously explained, in this group of hybrid vehicles A, B and C, each of the hybrid vehicles A, B and C basically includes an engine 1 with a set of engine specifications and an electric transmission 2 with an input rotary electric machine 5 and an output rotary electric machine 6. In this group of hybrid vehicles A, B and C, each of the input rotary electric machines 5 have an identical generated electric power specification (e.g., maximum generated electric power capacity), and each of the output rotary electric machines 6 have an identical output power specification (e.g., maximum output power capacity). By producing vehicles with these common aspects, a group of hybrid vehicle models can be produced while holding development costs and capital investment to a minimum. In other words, vehicles with these common aspects can be produced that also have different specifications. For example, as explained above, the vehicle A has these common aspects but does not include a storage device, while the vehicles B and C has the storage device 9 or 9b with different specifications (e.g., different electric capacities and different maximum output electric power. In particular, the storage device 9 of vehicle B has a relatively small electric capacity and a relatively small maximum output electric power, while the storage device 9b of vehicle C has a relatively a large electric capacity and a relatively large maximum output electric power.

The term "configured" as used herein to describe a component, section or part of a device includes hardware and/or software that is constructed and/or programmed to carry out the desired function. As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-145719. The entire disclosure of Japanese Patent Application No. 2001-145719 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A group of hybrid vehicles comprising:

a first hybrid vehicle model including
   a first engine having a first output shaft,
   a first input rotary electric machine with a first maximum generated electric power operatively coupled to the first output shaft,
   a first output rotary electric machine with a first maximum output power electrically coupled to the first input rotary electric machine and operatively coupled to a drive wheel of the first hybrid vehicle model, the first output rotary electric machine and the first engine being configured and arranged in a non-connectable arrangement with the first output rotary electric machine being configured to be driven only by electricity generated by the first input rotary electric machine, the first maximum generated electric power of the first input rotary electric machine being substantially equal to the first maximum output power of the first output rotary electric machine, and
   a first electric storage device with a first maximum output electric power operatively coupled to the first output rotary electric machine and configured in a non-charging arrangement with the first input rotary electric machine such that electric power generated by the first input rotary electric machine is transferred to the first output rotary electric machine without being stored; and a second hybrid vehicle model including
   a second engine having a second output shaft,
   a second input rotary electric machine with a second maximum generated electric power that is identical to the first maximum generated electric power, the second input rotary electric machine being operatively coupled to the second output shaft,
   a second output rotary electric machine with a second maximum output power that is identical to the first maximum output power, the second output rotary electric machine being electrically coupled to the second input rotary electric machine and operatively coupled to a drive wheel of the second hybrid vehicle model, the second output rotary electric machine and the second engine being configured and arranged in a non-connectable arrangement with the second output rotary electric machine being configured to be indirectly driven only by electricity generated by the second input rotary electric machine, and
   a second electric storage device with a second maximum output electric power that is larger than the first maximum output electric power, the second electric storage device being operatively coupled to the second input rotary electric machine and the second output rotary electric machine to store electric power generated by the second input rotary machine before transferring the electric power to the second output rotary electric machine.

2. The group of hybrid vehicles as recited in claim 1 wherein
   the first electric storage device has a first electric capacity, and
   the second electric storage device has a second electric capacity that is larger than the first electric capacity.

3. The group of hybrid vehicles as recited in claim 1, wherein
   the first input rotary electric machine and the first output rotary electric machine are housed inside a single first casing, and
   the second input rotary electric machine and the second output rotary electric machine are housed inside a single second casing that is identical to the first casing.

* * * * *